US010213051B2

(12) United States Patent
Colston et al.

(10) Patent No.: US 10,213,051 B2
(45) Date of Patent: Feb. 26, 2019

(54) OVAL-SHAPED GRILL WITH HINGED LID

(71) Applicant: Traeger Pellet Grills, LLC, Salt Lake City, UT (US)

(72) Inventors: Michael Colston, Stephensville, MI (US); Daniel A. C. Altenritter, Riverton, UT (US); Matthew G. Czach, Kalamazoo, MI (US)

(73) Assignee: Traeger Pellet Grills, LLC, Salt Lake City, UT (US)

( * ) Notice: Subject to any disclaimer, the term of this patent is extended or adjusted under 35 U.S.C. 154(b) by 146 days.

(21) Appl. No.: 15/070,225

(22) Filed: Mar. 15, 2016

(65) Prior Publication Data

US 2017/0067649 A1 Mar. 9, 2017

Related U.S. Application Data

(60) Provisional application No. 62/216,132, filed on Sep. 9, 2015.

(51) Int. Cl.
*A47J 37/07* (2006.01)
*A47J 37/06* (2006.01)
(Continued)

(52) U.S. Cl.
CPC ....... *A47J 37/0704* (2013.01); *A47J 37/0623* (2013.01); *F24C 1/16* (2013.01); *F24C 3/14* (2013.01); *F24C 5/20* (2013.01)

(58) Field of Classification Search
CPC .. A47J 37/0704; A47J 37/0623; A47J 37/067; F24B 1/022; F24B 1/192;
(Continued)

(56) References Cited

U.S. PATENT DOCUMENTS 639,099 A * 12/1899 Schoregge ............. F24C 15/08
126/275 R
1,300,710 A * 4/1919 Edwards ................ B65D 43/00
126/25 R
(Continued)

FOREIGN PATENT DOCUMENTS

CN 104352179 2/2015

OTHER PUBLICATIONS

International Search Report for application No. PCT/US2016/051066 dated Dec. 8, 2016.
(Continued)

*Primary Examiner* — Gregory Huson
*Assistant Examiner* — Daniel E Namay
(74) *Attorney, Agent, or Firm* — Workman Nydegger

(57) ABSTRACT

A grilling device includes an oven section having an outer wall with opposing side portions and an encircling body portion extending therebetween. The body portion has an access opening and the grilling device includes a lid that selectively covers the access opening by means of a handle attached thereto. The grilling device also includes opposing hinge elements connected to opposite sides of the lid and to the side portions of the outer wall, as opposed to the encircling body portion. In particular, the hinge elements are connected to respective rear areas of the side portions. Accordingly, the path of opening the lid has a different shape or curvature and thereby positions the handle substantially lower than if the hinge elements were connected to the body portion adjacent to the access opening. The opposing side portions have a substantially oval shape and the hinge elements have an elongated configuration.

20 Claims, 7 Drawing Sheets

(51) Int. Cl.
  *F24C 1/16* (2006.01)
  *F24B 1/02* (2006.01)
  *F24C 3/14* (2006.01)
  *F24C 5/20* (2006.01)

(58) Field of Classification Search
  CPC ...... F24B 1/02; F24C 1/16; F24C 3/14; F24C 5/20; F24C 7/10; F24C 15/023; F24C 15/02
  USPC ................... 126/25 R, 29, 37 A, 275 R, 220
  See application file for complete search history.

(56) References Cited

U.S. PATENT DOCUMENTS

| | | | | |
|---|---|---|---|---|
| 2,902,026 | A * | 9/1959 | Hathorn, Jr. | A47J 37/0704 126/2 |
| 3,533,393 | A * | 10/1970 | Haapanen | A47J 37/0786 126/25 C |
| 3,665,913 | A * | 5/1972 | Cagle, Jr. | A47J 37/0704 126/25 R |
| 3,769,901 | A | 11/1973 | Phillips | |
| 3,938,493 | A | 2/1976 | Bauer | |
| 4,076,008 | A * | 2/1978 | Deaton | A47J 37/00 126/25 R |
| 4,362,093 | A | 12/1982 | Griscom | |
| 4,592,335 | A * | 6/1986 | Beller | A47J 37/0704 126/25 A |
| 4,665,891 | A * | 5/1987 | Nemec | A47J 37/0704 126/25 R |
| 4,700,618 | A | 10/1987 | Cox | |
| 4,788,906 | A * | 12/1988 | Starks | A47J 37/0704 126/25 R |
| 5,031,602 | A * | 7/1991 | Vick | A47J 37/0713 126/1 AA |
| 5,070,857 | A | 12/1991 | Sarten | |
| 5,163,359 | A * | 11/1992 | McLane, Sr. | A47J 37/0713 126/25 R |
| 5,404,795 | A * | 4/1995 | Coble | A47J 37/0704 126/25 R |
| 5,473,979 | A | 12/1995 | Ruben | |
| 5,481,964 | A * | 1/1996 | Kitten | A47J 37/0704 126/25 R |
| 5,524,610 | A * | 6/1996 | Clark | F24J 2/02 126/682 |
| 5,694,917 | A | 12/1997 | Giebel | |
| 5,934,180 | A | 8/1999 | Lin | |
| 5,947,007 | A | 9/1999 | O'Grady | |
| 6,000,388 | A | 12/1999 | Andress | |
| 6,125,836 | A | 10/2000 | Felton | |
| 6,182,560 | B1 | 2/2001 | Andress | |
| 6,189,528 | B1 * | 2/2001 | Oliver | A47J 37/0704 126/25 R |
| 6,209,533 | B1 * | 4/2001 | Ganard | A47J 37/0704 126/25 R |
| 6,422,134 | B1 * | 7/2002 | Barksdale | A47J 37/0704 126/25 R |
| 6,557,545 | B2 | 5/2003 | Williams | |
| 6,810,792 | B1 | 11/2004 | Knight | |
| 6,913,011 | B1 | 7/2005 | Snider | |
| D510,835 | S | 10/2005 | Pai | |
| D534,755 | S | 1/2007 | Knight | |
| D535,522 | S | 1/2007 | Seager | |
| 7,156,087 | B1 | 1/2007 | Churchhill | |
| 7,624,675 | B2 * | 12/2009 | Galdamez | A23B 4/052 126/25 R |
| 7,753,047 | B1 * | 7/2010 | Trammell | A47J 37/0704 126/30 |
| 7,984,709 | B1 | 7/2011 | Brynes | |
| D660,646 | S | 5/2012 | Simms | |
| 8,381,712 | B1 * | 2/2013 | Simms, II | F24C 3/14 126/2 |
| D680,794 | S | 4/2013 | Chung | |
| 8,915,238 | B2 * | 12/2014 | Goeken | A47J 37/0704 126/25 R |
| D739,170 | S | 9/2015 | Chung | |
| D786,014 | S | 5/2017 | Knight | |
| 2003/0019492 | A1 * | 1/2003 | Williams | A47J 37/0704 126/41 R |
| 2005/0204934 | A1 | 9/2005 | Robertson | |
| 2005/0217659 | A1 * | 10/2005 | McClenahan | A47J 37/0704 126/25 R |
| 2006/0016447 | A1 * | 1/2006 | Meyer | A47J 36/06 126/276 |
| 2006/0042475 | A1 | 3/2006 | Craig | |
| 2006/0137676 | A1 | 6/2006 | Barker | |
| 2007/0163568 | A1 | 7/2007 | Murray | |
| 2007/0175467 | A1 * | 8/2007 | Liu | A47J 37/0704 126/25 R |
| 2007/0277805 | A1 * | 12/2007 | Ho | A47J 37/041 126/25 R |
| 2008/0011285 | A1 * | 1/2008 | Milligan | A47J 37/041 126/25 R |
| 2009/0199839 | A1 | 8/2009 | Hulsey | |
| 2010/0024797 | A1 * | 2/2010 | Tsung | A47J 36/12 126/25 R |
| 2010/0083947 | A1 * | 4/2010 | Guillory | A47J 37/0704 126/25 R |
| 2011/0079210 | A1 * | 4/2011 | Jackovitch | A47J 37/07 126/25 R |
| 2012/0192726 | A1 * | 8/2012 | Clearman | A47J 37/0641 99/447 |
| 2012/0216790 | A1 | 8/2012 | Hopkins | |
| 2012/0266857 | A1 | 10/2012 | Lin | |
| 2013/0061765 | A1 | 3/2013 | Reinhart | |
| 2013/0112088 | A1 | 5/2013 | May | |
| 2013/0298894 | A1 | 11/2013 | Kleinsasser | |
| 2014/0090634 | A1 * | 4/2014 | Li | A47J 37/0754 126/25 R |
| 2014/0261012 | A1 | 9/2014 | Perez, Jr. et al. | |
| 2015/0047512 | A1 * | 2/2015 | Marra | A47J 37/0647 99/339 |
| 2015/0047515 | A1 | 2/2015 | Jenness | |
| 2015/0047625 | A1 | 2/2015 | Weil | |
| 2015/0079250 | A1 | 3/2015 | Ahmed | |
| 2015/0144238 | A1 * | 5/2015 | Traeger | A47J 37/0786 150/165 |
| 2015/0265099 | A1 | 9/2015 | Coffie | |
| 2015/0305559 | A1 | 10/2015 | Chung | |
| 2017/0065124 | A1 | 3/2017 | Colston | |
| 2017/0196400 | A1 | 7/2017 | Colston | |

OTHER PUBLICATIONS

Restriction Requirement for U.S. Appl. No. 14/906,526 dated Sep. 12, 2017.
International Search Report and Written Opinion for application No. PCT/US2015/046349 dated Dec. 28, 2015.
Combined Search Examination Report for application No. GB1604584.1 dated Aug. 1, 2016.
amazon.com Inc., 2014, "The Original Bar-Be Quick Build In Grill & Bake + Free pack of Beechwood smoking chips", amazon.co.uk, [online], Available from https://www.amazon.co.uk/Original-Bar-Be-Quick-Build-Beechwood-smoking/dp/B00IGUPK4C [Accessed Jul. 22, 2015].
International Search Report for application No. PCT/US2016/051060 dated Dec. 8, 2016.
Non-Final Office Action for U.S. Appl. No. 14/906526 dated Dec. 11, 2017.
Non-Final Office Action for U.S. Appl. No. 29/539,822 dated Dec. 28, 2017.
Traeger Timberline 1300, by John R. Delaney, PCMag [online], published Aug. 4, 2017, [retrieved on Dec. 21, 2017]. Retrieved from the Internet, URL: https://www.pcmag.com/review/355354/traeger-timberline-1300.
Non-Final Office Action for U.S. Appl. No. 29/539,825 dated Dec. 28, 2017.

(56) References Cited

OTHER PUBLICATIONS

Non-Final Action mailed for U.S. Appl. No. 15/070,220 dated Sep. 6, 2018.

* cited by examiner

OVAL-SHAPED GRILL WITH HINGED LID

CROSS-REFERENCE TO RELATED APPLICATIONS

This application claims priority to and the benefit of U.S. Provisional Patent Application No. 62/216,132, entitled "Oval Shaped Grill with Hinged Lid," filed on Sep. 9, 2015, which application is incorporated by reference herein in its entirety.

BACKGROUND

1. Technical Field

The present disclosure relates to systems, methods, and devices for grilling and/or smoking food products. In particular, the present disclosure relates to grilling devices having an oval shape and rear- and/or side-mounted lid hinges.

2. Related Technology

Grilling and smoking food products typically includes the use of a grilling device having an internal grilling compartment. When the lid is closed, the grilling device can retain heat and smoke within the internal grilling compartment to cook and smoke the food product. Recent trends include grilling devices having a barrel-shaped outer wall with a circular cross-section, a frontal opening in the outer wall, and an upward-opening, rounded lid attached to the top of the outer wall by means of opposing hinges.

Unfortunately, the circular cross-section of the barrel-shaped outer wall limits the size of the food products that can be successfully prepared therein. For instance, a large pork shoulder, turkey, or other tall food products may not fit within the grilling device without being cut into smaller pieces. In addition, the top connection for the lid forces a user to open the lid in an uncomfortable and dangerous manner. Specifically, a rounded lid opens towards the user before swinging upward. Moreover, the top connection requires the user to over reach and risk getting burned by the grill or lid.

Accordingly, there are a number of disadvantages in grilling devices and systems that can be addressed.

BRIEF SUMMARY

Implementations of the present disclosure solve one or more of the foregoing or other problems in the art with improved grilling devices, as well as components and/or sub-components thereof, and systems and methods incorporating the same. In particular, implementations of the present disclosure relate to a grilling device having rear- and/or side-mounted lid hinges and/or an oval shaped configuration. As such, the path of opening the lid has a different shape or curvature and thereby positions the handle of the lid substantially lower than if the hinge elements were connected to the top portion of the grilling device adjacent to the access opening.

One or more implementations of the present disclosure can include a substantially oval-shaped, wood pellet grill having an outer wall partially bounding an inner cavity. The outer wall can have an opening disposed therein, and the grilling device can include a lid for covering the opening. The lid can be hingedly connected to the outer wall and can be actuated between an open position and a closed position. Opposing hinges can be rotatably connected to opposing side portions of the outer wall and attached to the lid. The hinges can be attached to the outer wall behind (to the rear of) and/or below (underneath or beneath) the aft of the grill and/or lid.

Accordingly, the hinges may not be connected to the lid and/or the outer wall at an interface between the upper edge of the lid and the upper edge of the outer wall (e.g., in the closed position). The shape, size, and attachment configuration of the hinges can provide an improved path of opening and/or can dispose the opened lid such that a user can more easily actuate the handle without overextending the user's reach and/or contacting the lid.

Additional features and advantages of exemplary implementations of the present disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the present disclosure can be obtained, a more particular description of the implementations briefly described above will be rendered by reference to specific implementations thereof which are illustrated in the appended drawings. For better understanding, the like elements have been designated by like reference numbers throughout the various accompanying figures. Understanding that these drawings depict only typical implementations of the invention and are not therefore to be considered to be limiting of its scope, the invention will be described and explained with additional specificity and detail through the use of the accompanying drawings in which.

DETAILED DESCRIPTION

Figure 1A:
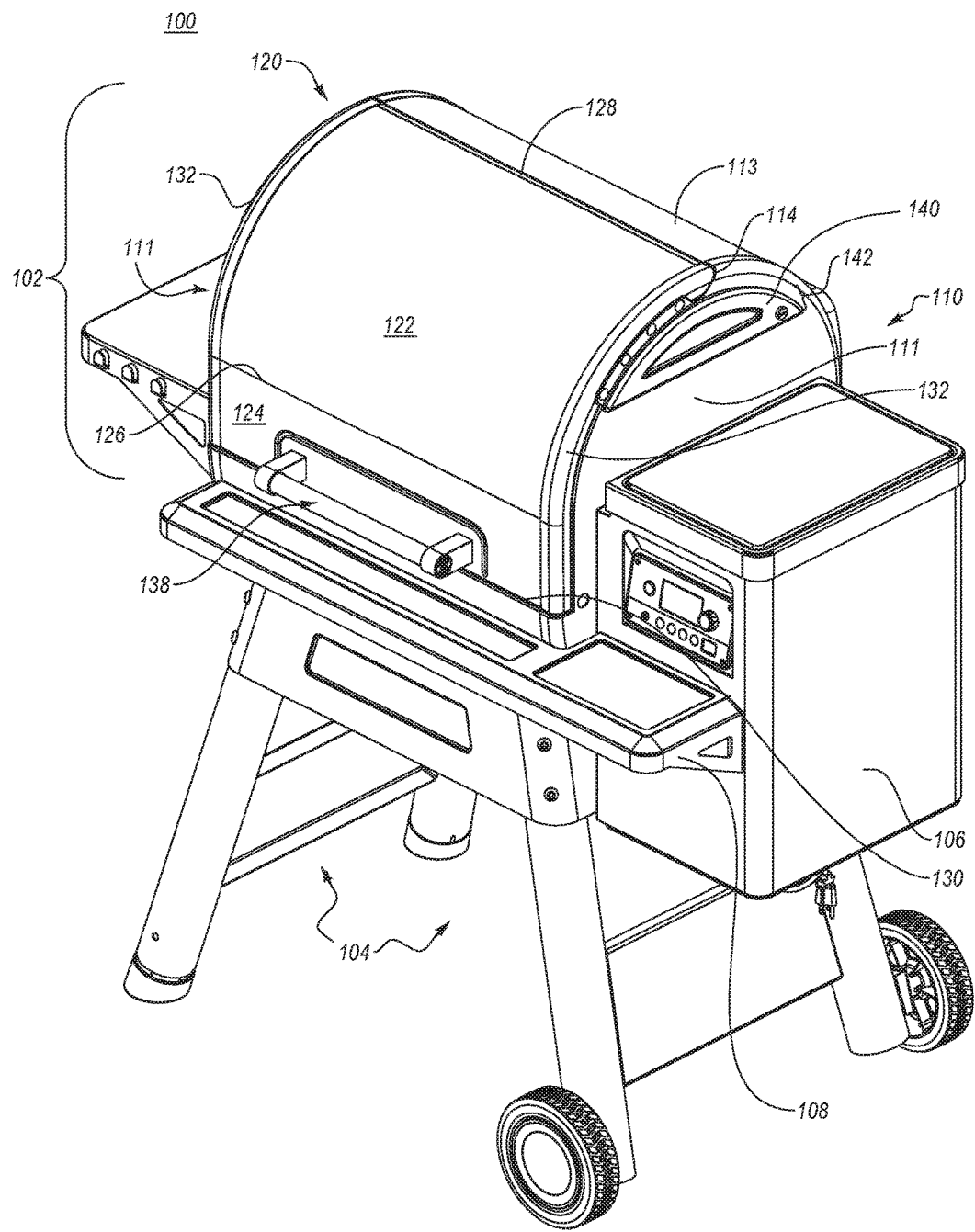
FIG. 1A illustrates a perspective view of a grilling device in a closed configuration according to an implementation of the present disclosure.

Before describing the present disclosure in detail, it is to be understood that this disclosure is not limited to the specific parameters of the particularly exemplified systems, apparatus, assemblies, products, devices, kits, methods, and/or processes, which may, of course, vary. It is also to be understood that much, if not all of the terminology used herein is only for the purpose of describing particular embodiments of the present disclosure, and is not necessarily intended to limit the scope of the disclosure in any particular manner. Thus, while the present disclosure will be described in detail with reference to specific configurations, embodiments, and/or implementations thereof, the descriptions are illustrative only and are not to be construed as limiting the scope of the claimed invention.

Various aspects of the present disclosure, including devices, systems, methods, etc., may be illustrated with reference to one or more exemplary embodiments or implementations. As used herein, the terms "exemplary embodiment" and/or "exemplary implementation" mean "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

Furthermore, unless defined otherwise, all technical and scientific terms used herein have the same meaning as commonly understood by one of ordinary skill in the art to which the present disclosure pertains. While a number of methods, materials, components, etc. similar or equivalent to those described herein can be used in the practice of the present disclosure, only certain exemplary methods, materials, components, etc. are described herein.

It will be noted that, as used in this specification and the appended claims, the singular forms "a," "an" and "the" include plural referents unless the content clearly dictates otherwise. Thus, for example, reference to a "column" includes one, two, or more columns. Similarly, reference to a plurality of referents should be interpreted as comprising a single referent and/or a plurality of referents unless the content and/or context clearly dictate otherwise. Thus, reference to "columns" does not necessarily require a plurality of such columns. Instead, it will be appreciated that independent of conjugation; one or more columns are contemplated herein.

As used throughout this application the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has," "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct association between two components or, where appropriate, an indirect association with one another through intervening or intermediate components. In contrast, when a component is referred to as being "directly coupled", "directly attached", "directly connected," and/or "directly joined" to another component, no intervening elements are present or contemplated.

Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "forward," "rear," "left," "right," "up," "down," "upper," "lower," "inner," "outer," "internal," "external," "interior," "exterior," "anterior," "posterior," "proximal," "distal," and the like can be used only for convenience and/or solely to indicate relative directions and/or orientations and may not otherwise be intended to limit the scope of the disclosure, including the specification, invention, and/or claims. Accordingly, such directional and/or arbitrary terms are not to be construed as necessarily requiring a specific order or position.

To facilitate understanding, like reference numerals have been used, where possible, to designate like elements common to the figures. Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and or sub-elements of a parent element may each include separate letters appended to the element number.

In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where two or more values, or a range of values (e.g., less than, greater than, at least, and/or up to a certain value, and/or between two recited values) is disclosed or recited, any specific value or range of values falling within the disclosed values or range of values is likewise disclosed and contemplated herein. Thus, disclosure of an illustrative measurement or distance less than or equal to about 10 units or between 0 and 10 units includes, illustratively, a specific disclosure of: (i) a measurement of 9 units, 5 units, 1 units, or any other value between 0 and 10 units, including 0 units and/or 10 units; and/or (ii) a measurement between 9 units and 1 units, between 8 units and 2 units, between 6 units and 4 units, and/or any other range of values between 0 and 10 units.

Various modifications can be made to the illustrated embodiments without departing from the spirit and scope of the invention as defined by the claims. Thus, while various aspects and embodiments have been disclosed herein, other aspects and embodiments are contemplated. It is also noted that systems, apparatus, assemblies, products, devices, kits, methods, and/or processes, according to certain embodiments of the present disclosure may include, incorporate, or otherwise comprise properties, features, components, members, and/or elements described in other embodiments disclosed and/or described herein. Thus, reference to a specific feature in relation to one embodiment should not be construed as being limited to applications only within said embodiment. The headings used herein are for organizational purposes only and are not meant to be used to limit the scope of the description or the claims.

Embodiments described herein include systems, methods, and devices for grilling. In particular, certain implementations of the present disclosure relate to improved grills and grilling devices, as well as components and/or sub-components thereof and/or systems, methods, and apparatus incorporating the same. Some implementations of the present disclosure relate to (oval-shaped) grilling devices having rear- and/or side-mounted lid hinges. As such, the path of opening the lid has a different shape or curvature and thereby positions the handle of the lid substantially lower than if the hinge elements were connected to the top portion of the grilling device adjacent to the access opening.

The grilling devices can comprise a substantially barrel-shaped, wood pellet grill having an outer wall partially bounding an inner cavity. The outer wall can have an opening disposed therein, and the grilling device can include a lid for covering the opening. The lid can be hingedly connected to the outer wall and can be actuated between an open position and a closed position. Opposing hinges can be rotatably connected to opposing side portions of the outer wall and attached to the lid. The shape, size, and attachment configuration of the hinges can provide an improved path of opening and/or can dispose the opened lid such that a user can more easily actuate the handle without contacting the lid.

It will be appreciated that while reference is made to "grills," "grilling," "grilling devices," "grilling systems," and the like, the present disclosure extends to smoking, baking, roasting, braising, barbequing, and other food preparation methods, as well as devices and systems for warming, cooking, and/or preparing food products in any of the above-recited or other manners. Likewise, while reference is made to an "oven section," "cooking section," "heating area," and the like, the present disclosure also extends to various spaces suitable for heating, including open grilling surfaces (e.g., exposed to ambient air), closed kilns and ovens, heating spaces that can be selectively opened and closed, and the like.

Accordingly, the particular features, configurations, design characteristics, and/or components (assemblies) described herein can be applicable to a variety of different fields of use extending beyond cooking or otherwise preparing food products. These different fields of use are also contemplated herein. Thus, reference to one or more "grills," "grilling," "grilling devices," "grilling systems," and the like, or one or more components thereof, should not be construed as being limited only to applications involving food grilling or grilling devices.

Grills of the present disclosure can be heated using a variety of fuels. For example, the disclosure extends to grills configured to burn propane and/or natural gas and grills configured to burn solid fuel (e.g., charcoal, briquettes, wood, etc.). In some embodiments, the grill is configured to use wood pellets as fuel. In addition, in some embodiments, grills according to the present disclosure are configured to be moveable (e.g., by means of wheel(s) or other moving elements).

In other embodiments, grills may be configured as stationary appliances and/or may be installed in a relatively permanent fashion (e.g., bolted or otherwise fastened to a wall and/or floor, or otherwise installed as part of a kitchen or cooking area). Furthermore, grills according to the present disclosure can be configured for outdoor use in some embodiments. For instance, certain regulations and/or safety concerns may recommend or require the use of combustion-style grills only in outdoor, open-air areas, away from structures, vegetation, and/or other potentially flammable materials.

In addition, certain embodiments may be described with reference to one or more metals or metal materials. As used herein, the term "metal" refers to a material that comprises an elemental metal or metal alloy, blend, or combination. Certain embodiments may also refer to heat and/or smoke distribution and/or circulation. It will be appreciated that such forms of directing or using heat and/or smoke can include active distribution and/or circulation or passive distribution and/or circulation.

It is further to be understood that some of the drawings included herewith, and which are referenced herein, are diagrammatic, schematic, and other representations of example embodiments, and are not limiting on the present disclosure. Moreover, while various drawings are provided at a scale that is considered functional for some embodiments, the drawings are not necessarily drawn to scale for all contemplated embodiments. No inference should therefore be drawn from the drawings as to the necessity of any scale. Rather, the proportionality, scale, size, shape, form, function, and/or other features of the disclosed embodiments can be altered without necessarily departing from the scope of this disclosure (unless such feature is expressly described herein as essential).

Furthermore, as indicated above, in the exemplary embodiments illustrated in the figures, like structures will be provided with similar reference designations, where possible. Specific language will be used herein to describe the exemplary embodiments. Nevertheless it will be understood that no limitation of the scope of the disclosure is thereby intended. Rather, it is to be understood that the language used to describe the exemplary embodiments is illustrative only and is not to be construed as limiting the scope of the disclosure (unless such language is expressly described herein as essential).

Alterations and further modifications of the inventive features illustrated herein, and additional applications of the principles illustrated herein, which would occur to one skilled in the relevant art and having possession of this disclosure, are to be considered within the scope of this disclosure. Unless a feature is described as requiring another feature in combination therewith, any feature herein may be combined with another feature of a same or different embodiment disclosed herein. Furthermore, various well-known aspects of illustrative systems, methods, apparatus, and the like are not described herein in particular detail in order to avoid obscuring aspects of the example embodiments.

Figure 1B:
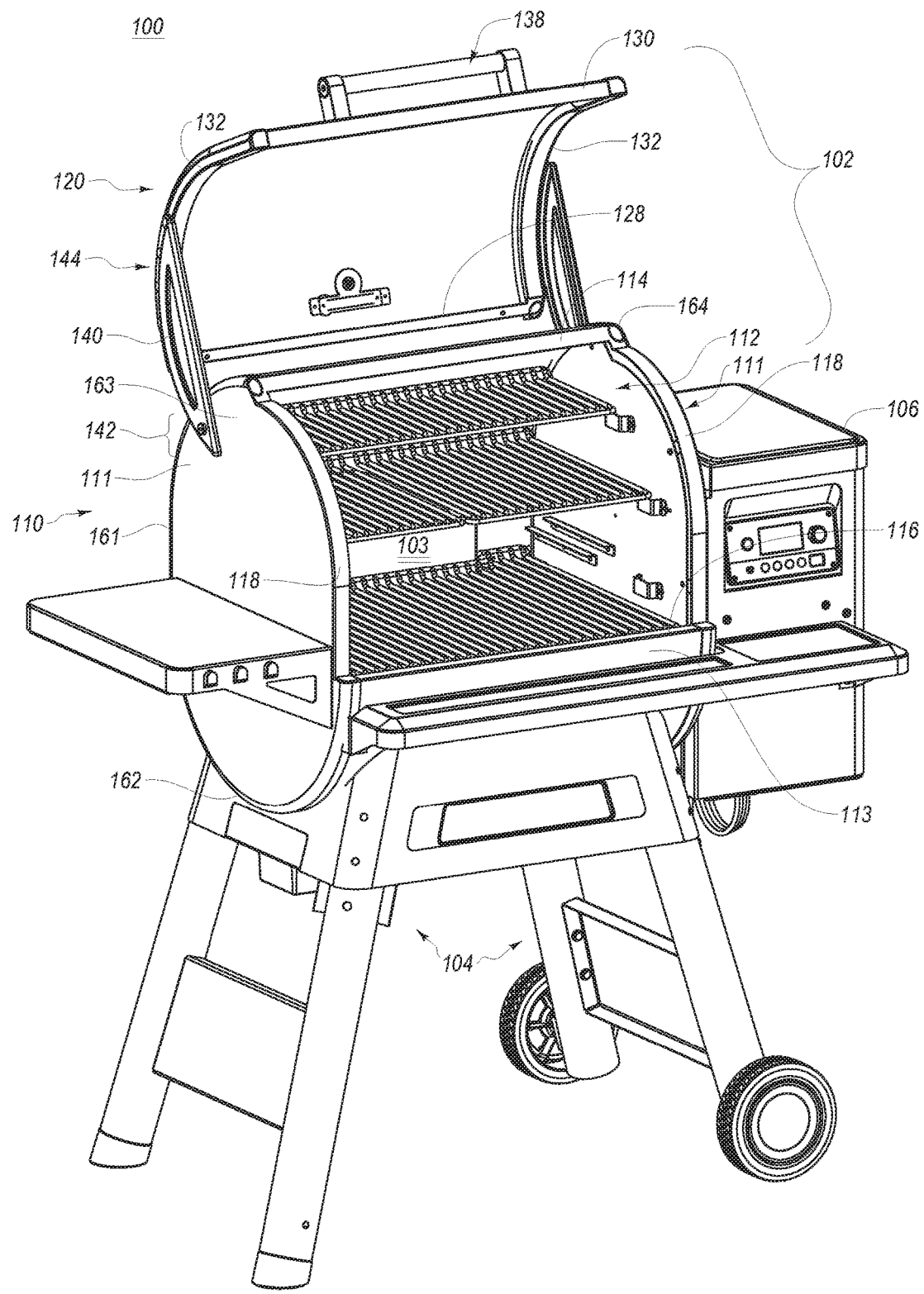
FIG. 1B illustrates an opposing perspective view of the grilling device of FIG. 1 in an opened configuration.

Reference will now be made to the figures to describe various aspects of example embodiments of the disclosure. FIGS. 1A and 1B depict a grilling device 100 in a closed configuration (FIG. 1A) and in an open configuration (FIG. 1B). Grilling device 100 has an oven section 102 and an optional support element 104 (e.g., supporting oven section 102 above the ground). As mentioned above, the support structure 104 may include wheeled legs for moving the grilling device 100.

Grilling device 100 can also have a hopper 106 for delivering fuel (e.g., wood pellets) into oven section 102 and/or one or more utility shelves 108. Oven section 102 can have an outer wall 110 at least partially bounding an internal grilling compartment 103. The oven section 102 can also have an access opening 112 disposed in the outer wall 110. Oven section 102 can also have a lid 120 that selectively covers access opening 112 and/or that is selectively actuatable between a closed position (FIG. 1A) and an open position (FIG. 1B).

Outer wall 110 ("barrel" or "grill body") can have opposing side portions (e.g., side wall panels, or "side walls") 111 and a body portion 113 extending between opposing side portions 111. Upon lifting lid 120 (FIG. 1B), a user can access internal grilling compartment 103 via access opening 112. FIG. 1B further shows that access opening 112 can have a perimeter comprising an upper edge 114, a lower edge 116, and opposing side edges 118 that line the opposing side walls 111. Lid 120 can similarly have a perimeter comprising an upper edge 128, a lower edge 130, and opposing side edges 132, each of which can align with corresponding edges 118 of the access opening 112 when lid 120 is in the closed position. Thus, lid 120 can entirely cover access opening 112 and/or can be sized to correspond to the size thereof.

Lid 120 can also have a (curved) upper panel 122 and an optional (linear) lower panel 124. An optional seam 126 can extend between upper panel 122 and lower panel 124 (e.g., between opposing side edges 132). In at least one embodiment, seam 126 can provide a hinged connection between upper panel 122 and lower panel 124 such that in the open configuration, lower panel 124 extends downward from upper panel 122. In particular, the hinged connection can provide and/or ensure that lower panel 124 extends from upper panel 122 at seam 126 in a substantially straight and/or linear direction (e.g., at approximately 180 degrees) when lid 120 is in the closed configuration. However, in the opened configuration, lower panel 124 can extend from upper panel 122 at seam 126 at an angle (e.g., less than 180 degrees).

Oven section 102 (outer wall 110, therefore, comprising opposing side portions 111, body portion 113 and/or lid 120) can have a substantially oval-shaped configuration. For instance, as illustrated in FIGS. 1A and 1B, oven section 102 can have a pill or an oval cross-sectional shape (e.g., with a curved top, an opposing curved bottom, and opposing straight and/or linear side edges extending between the curved top and bottom). Accordingly, unlike existing barrel-shaped grills having a round, circular cross-sectional shape from a side view, the ovular shape of oven section 102 provides a substantially taller internal grilling compartment 103 and access opening 112, and thus provides a substantial higher amount of additional height for a food product to be placed therein.

For example, as shown in FIG. 1B, the grilling device 100 may accommodate multiple grilling racks at a variety of different height levels. The pill or oval cross-sectional shape with a curved top and opposing curved bottom allows for greater internal height and, correspondingly, more internal space for grilling racks. Indeed, the oval-shaped configuration may allow for many different types of food to be placed on the highest internal rack, and still have sufficient space between the rack and the grill's lid 120. The oval shape, in combination with the placement of the hinges 140 behind the peak 164 of the grilling device 100, provides a greater amount of space on each grilling rack, and especially on the uppermost grilling rack, as will be explained further below.

FIGS. 1A and 1B further show that the grilling device 100 can have an opening mechanism such as a lid in order to access the internal grilling compartment 103. The lid opening mechanism can comprise a handle 138 and/or opposing hinge elements 140 attached to lid 120. Hinge elements 140 can each be attached to opposing sides of lid 120 and to one of opposing side portions 111 of outer wall 110, as opposed to body portion 113. For instance, hinge element 140 can be attached to the grill via side portion 111 at a first interface 142 and attached to lid 120 at a second interface 144.

Accordingly, opposing hinge elements 140 can be attached, respectively, to opposing side portions 111 of outer wall 110 at first interface 142. In addition, hinge element 140 can be attached to side portion 111 of outer wall 110 at a position below the top, upper end, aft, crest, or peak of grilling device 100, oven section 102, outer wall 110, lid 120, etc. Thus, first interface 142 can be below the top, upper end, aft, crest, or peak 164 of grilling device 100, oven section 102, outer wall 110, lid 120, etc.

In contrast, existing grills often include one or more hinges attached at the top of the grill between the lid and body thereof. For instance, the one or more hinges are often attached to the adjacent upper edges of the body and lid such that the lid opens about the respective upper edges.

Figure 2:
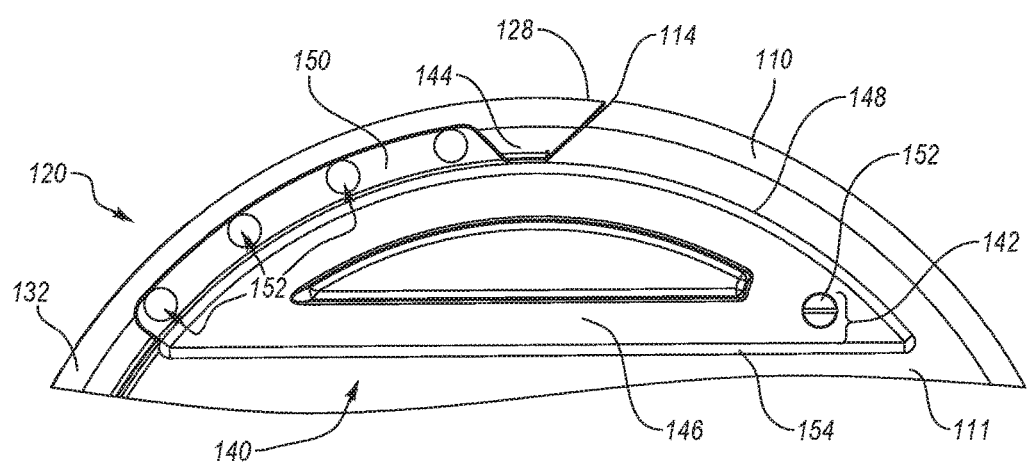
FIG. 2 illustrates a detailed view of the grilling device of FIG. 1A.

As depicted in FIG. 2, hinge element 140 can comprise an elongated hinge body 146 and can include an attachment bracket 150 extending from hinge body 146. Hinge body 146 can have a (substantially straight and/or linear) lower edge 154 and a (curved) upper edge 148. A first, rear end of hinge element 146 can be rotatably attached to (an upper area of) side portion 111 at first interface 142 by means of a first fastener 152. First fastener 152 can comprise a shoulder bolt in some embodiments. A second, front end of hinge element 146 can be (non-rotationally) attached to lid 120 by means of one or more additional fasteners 152. For instance, attachment bracket 150 of hinge element 146 can be (non-rotationally) attached to side edge 132 of lid 120. Accordingly, hinge element 146 can rotate about first interface 142 (but not about second interface 144).

FIG. 2 further shows that attachment bracket 150 can be contoured to the shape of lid 120 and/or upper portion 122 thereof (see also FIGS. 1A and 1B). Furthermore, upper edge 148 can be contoured to the (rounded) shape of the upper (curved) edge of side portion 111 of outer wall 110. As further depicted in FIG. 2, upper edge 128 of lid 120 and upper edge 114 of and/or access opening 112 can be adjacent to one another in the closed configuration.

Figure 3:
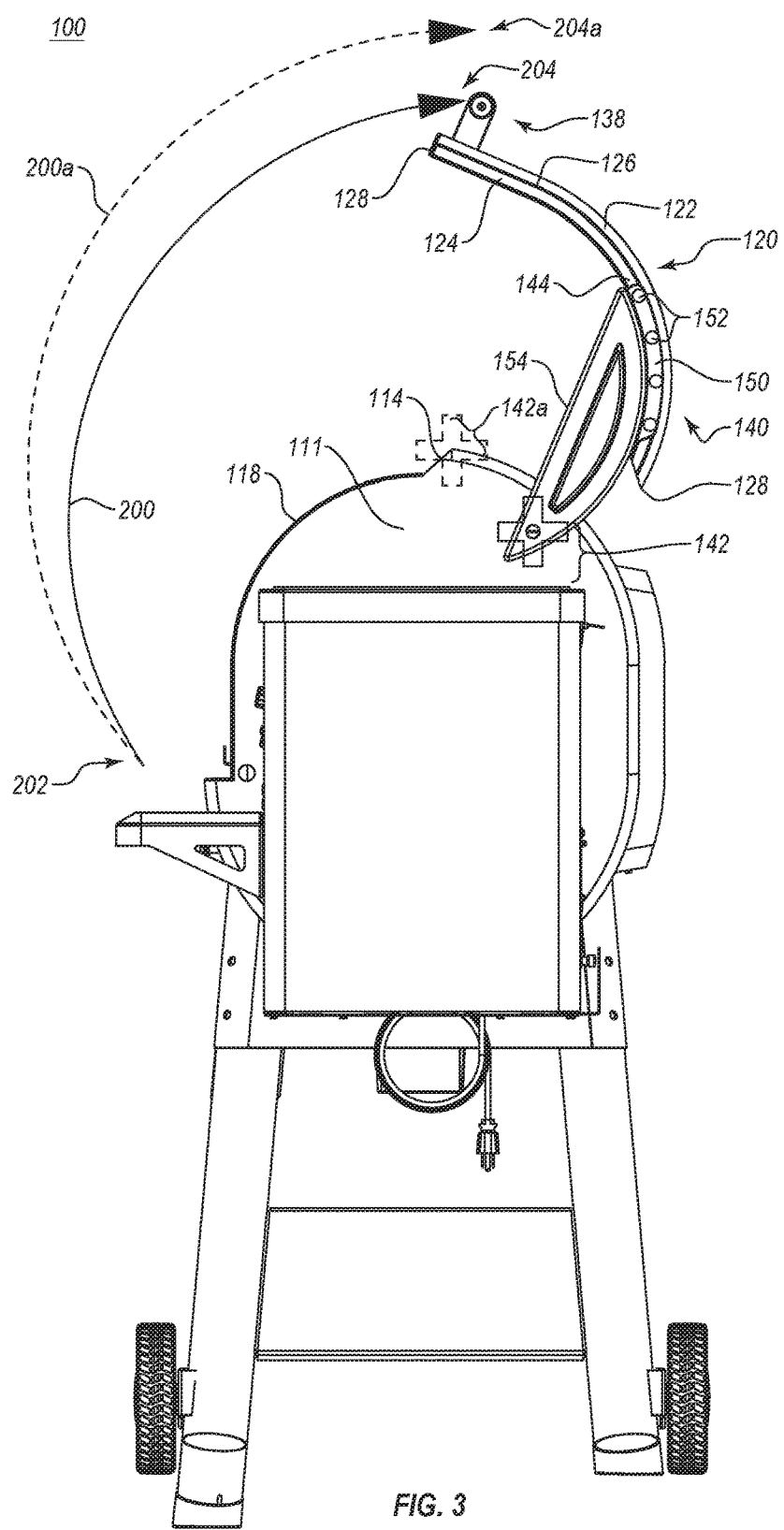
FIG. 3 illustrates a side elevation view of the grilling device of FIG. 1 in an opened configuration.

However, as depicted in FIG. 3, upper edge 128 of lid 120 can be separated from upper edge 114 by a substantial distance in the opened configuration. Indeed, upper edge 128 of lid 120 can be disposed substantially behind and/or rearward of upper edge 114 in the opened configuration. FIG. 3 further depicts a starting point in the closed position 202, a path or curvature of opening 200, and an ending point and/or opened position 204a of handle 138. Because hinge elements 140 are connected to side portions 111, lid 120 and/or handle 138 has a unique path or curvature of opening 200 and/or ending point 204a.

For instance, existing grills often connect the back of the lid to an upper portion of the grill body adjacent to the grill opening such that the lid is attached to the body at an interface 142a (shown in dotted-line). In such a configuration, the lid and/or handle may have a similar starting point. However, as illustrated in FIG. 3, such a configuration directs the lid and/or handle through a sub-optimal path or curvature of opening 200a and/or to sub-optimal ending point 204. It is noted that at interface 142a, path 200a extends forward, towards a user's typical location in front of grilling device 100.

Accordingly, the user may need to back up as the lid is opened. In addition, ending point 204 is substantially higher and/or elevated compared to ending point 204a. Accordingly, a user would need to reach further in order to grab the handle with interface 142a and, thereby, risk being burned by contacting lower edge 128 (e.g., with the wrist as the user grasps the handle).

In additional embodiments of the present disclosure, lower portion 124 of lid 120 can pivot (downward) at seam 126 relative to upper portion 122 (e.g., when lid 120 is in the opened configuration) such that handle 120 and/or ending point 204a is even closer to starting point 202.

In certain embodiments, the path or curvature of opening 200 can be at least partially determined by the length of hinge element 140 and/or lower edge 154 thereof, the position of first interface 142, the distance between first interface 142 (or fastener 152 connecting hinge element 140 to side portion 111) and a distal fastener 152a connecting attachment bracket 150 of hinge element 140 to lid 120 at second interface 144, and/or one or more additional factors.

In one specific embodiment, a grilling device 100 is provided that includes the following: an oven section 102 having an outer wall 110 including opposing side walls 111, where each side wall has a curved upper portion. The grilling device 100 also includes a lid 120 movably connected to each of the opposing side walls 111 of the outer wall 110. This moveable connection allows actuation of the lid 120 to provide access to the oven section 102 of the grilling device 100. The moveable connection may include hinge element 140, or some other type of moveable fastener.

For instance, the moveable connection may include a shoulder bolt which is attached to the side portion 111 of the outer wall 110. In such cases, the shoulder bolt would fasten the lid 120 to the outer wall 110 of the grilling device, while allowing movement of the lid with respect to the body of the grilling device. It will be understood, of course, that substantially any type of fastener may be used to rotatably attach the lid 120 to the grill body 113.

Continuing this example, the grilling device 100 may thus include a hinge element 140 attached to the lid and to the opposing side walls 111 of the outer wall 110. The hinge 140 may be of substantially any design, including that shown in FIG. 2. The hinge 140 may be curved along the upper edge 148, while having an elongated hinge body 146. The lower edge 154 may be substantially straight, and may run parallel to the top edge of the hopper 106 when viewed from the side (as generally shown in FIG. 3). The hinge element 140 may include one or more fasteners 152 that fasten the attachment bracket 150 of the hinge to the front end of the hinge (four are shown in FIGS. 1A-6, although it will be understood that substantially any number of fasteners may be used).

Figure 4:
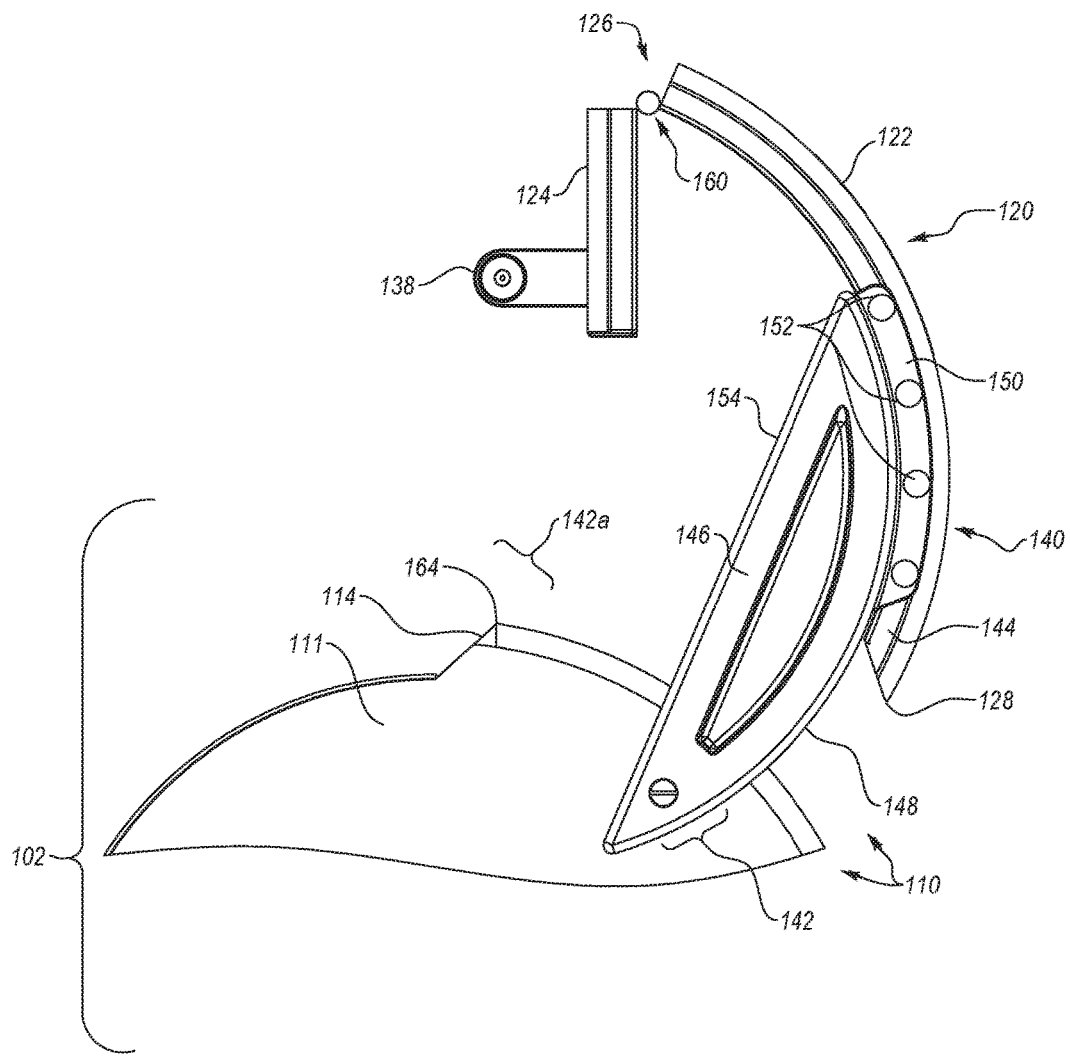
FIG. 4 illustrates a detailed sided view of the lid of the grilling device of FIG. 1.

The hinge element 140 may be affixed to the curved upper portion of each of the opposing side walls 111 below the peak 164 (FIG. 4). For instance, as shown in FIGS. 1B and 4, the upper portion of the opposing side portions 111 may have an apex or peak 164. In some cases, this apex or peak 164 is defined by the upper edge 114. This apex or peak 164 may be positioned in the top center of the opposing side portions 111, or may appear fore or aft of the center of the opposing side portions 111.

The lid 120 of the grilling device may attach at the first interface 142, as shown in FIGS. 2 and 3. The first interface 142 may be positioned below the top, upper end, aft, crest, or peak 164 of the grilling device 100, of the oven section 102, of the outer wall 110, or of the lid 120. As shown in FIG. 3, the first interface 142 is positioned below the top of the outer wall 110, and behind the crest or peak 164 of the opposing side portions 111. The lid 120 may thus be rotatably attached to a position that is behind the peak 164 of the opposing side portions 111. This position may also be described in relation to the side edge 118 of the grilling device 100. Indeed, as shown in FIGS. 1B and 3, the first interface 142 appears on a rearward portion of side edge of the grill body 113. This positioning of the first interface 142 causes the lid to follow a specified arc when being opened.

Indeed, as shown in FIG. 3, dotted line 200a shows the opening arc of a conventional, round-barreled grill. As can be seen, the arc is initially directed toward the grill user, and then substantially upward and away from the user. Because of this arc, the lid 120 of a round-barreled grill may end at a position that is substantially farther away from the user (e.g. ending point 204a) and, as such, may cause the user to burn their arm on the grill lid. In contrast thereto, the specified opening arc of the grilling device 100 (arc 200) is directed only slightly (if at all) toward the user initially, while following to an ending position that is substantially lower than that of a barrel-shaped grill (e.g. ending point 204). This lower positioning may prevent the grill user from burning their arm or hand on the grill lid 120.

In another embodiment generally illustrated in FIG. 4, a lid 120 may be provided and implemented in conjunction with grilling device 100. This grilling device 100 may include an oven section 102, an outer wall 110 and two opposing side walls 111 that have a substantially oval-shaped configuration. The lid of FIG. 4, which is configured for operation on such an oval-shaped grill, includes an upper panel 122 and a lower panel 124 separated by a seam 126. The upper panel 122 may be curved to follow the curve of the oval-shaped grill, while the lower panel may be substantially linear. The lower panel 124 of the lid 120 may have a handle 138 fixedly mounted thereto. As shown in FIG. 4, the upper panel 122 of the lid 120 may be hingedly attached to the lower panel 124 of the lid 120.

FIG. 4 shows that hinge 160 (or a plurality of hinges) may be placed at the seam 126, such that the hinges fasten to both the upper panel 122 and the lower panel 124 of the lid 120. The hinge 160 may allow the lower panel 124 to swing down to a substantially perpendicular position relative to the upper panel 122 of the lid 120. In some embodiments, the hinges may prevent movement beyond a specified position (e.g. 90 degrees) or may allow the lower panel 124 to swing back until contact is made with the underside of the grill lid 120. Thus, in embodiments where the lower panel 124 of the lid 120 is hingedly attached to the upper panel 122 of the lid, the lower panel 124 may extend downward from the upper panel 122 of the lid 120.

Figure 5:
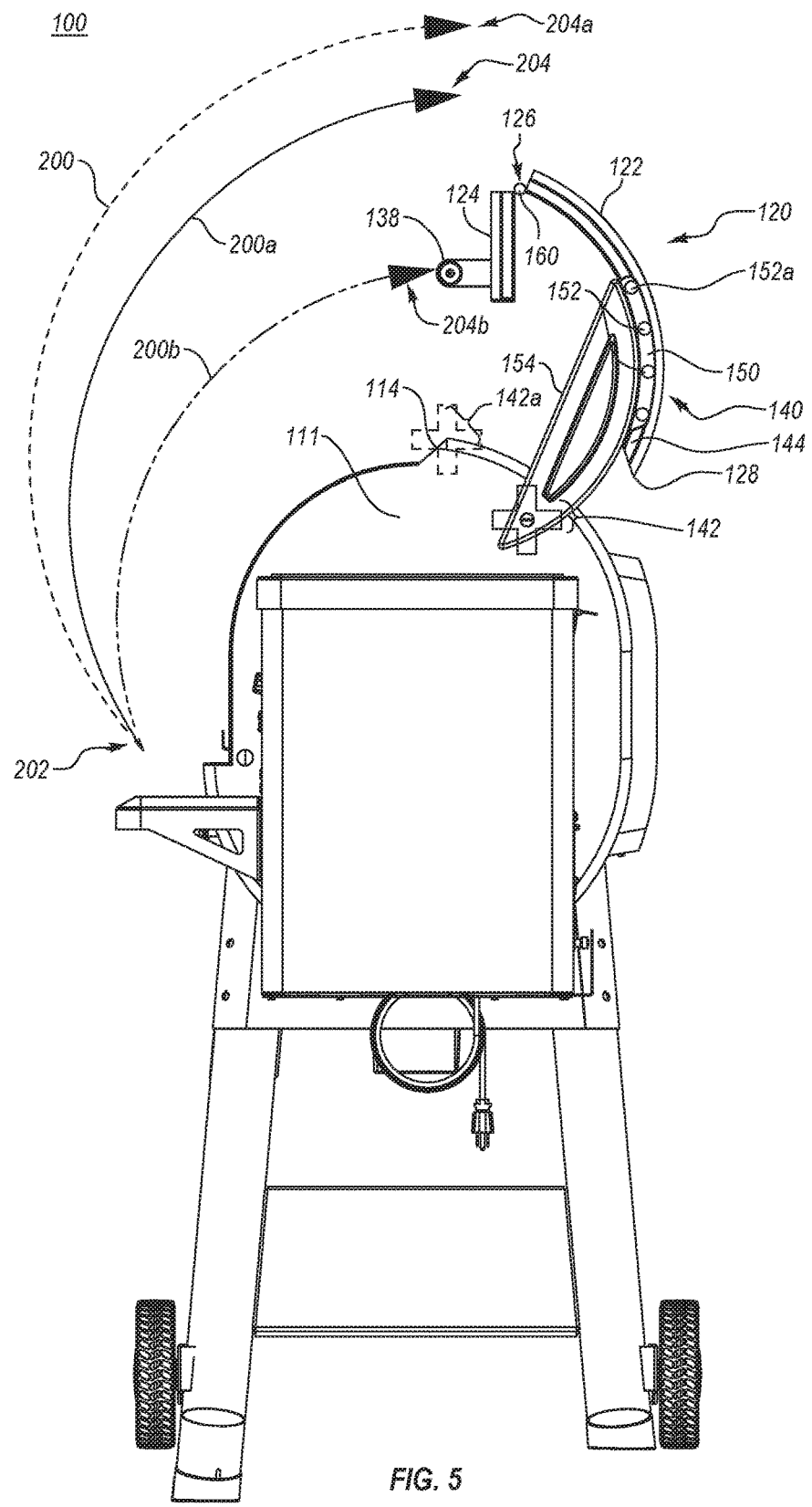
FIG. 5 illustrates a side elevation view of the lid of FIG. 4 in operation with the grilling device.

As shown in FIG. 5, when the grilling device 100 is in an open configuration in which the lid 120 is open, the lower panel 124 extends downward from the upper panel at an angle that may be more or less than 90 degrees relative to the upper panel 124. In such a configuration, it can be seen from opening arc 200b that the path of the handle 138 may be altered from that of the barrel-shaped grill (200) and from that of the grilling device 100 (200a) where the lower panel 124 is fixedly attached to the upper panel 122 (as shown in FIGS. 1A-3).

Indeed, the opening arc 200b for lid 120 in the embodiment shown in FIG. 5, where the lower panel 124 is hingedly attached to the upper panel 122, extends little if at all toward the grill user during initial operation, and ends at an end point 204b that is substantially lower than end points 204 or 204a. Thus, a hinged connection between upper panel 122 and lower panel 124 of lid 120 may allow an ending point 204b that is substantially closer to starting point 202, and may thus provide easier operation for the grill user.

In the embodiment shown in FIG. 5, where the lower panel 124 is hingedly attached to the upper panel 124 of the lid 120, when the lid is in a closed configuration in which the lid of the grilling device 100 is closed, the lower panel 124 extends downward from the upper panel 122 in a substantially linear direction. The hinge 160 may be a single hinge that runs substantially the length of the seam 126. Alternatively, multiple hinges 160 may be placed along the seam 126, such as having a hinge on each end of the seam, or having a third hinge in between the two end hinges.

Accordingly, in the closed configuration, the seam 126 is closed as the upper edge of the lower panel 124 abuts the lower edge of the upper panel 122. The hinge or hinges 160 used in such an embodiment may extend the length of the seam 126, or may appear at specified spots along the seam (e.g. one hinge on the right side of the seam, and another hinge on the left side of the seam. The hinge or hinges 160 may fasten to the grill 100 using any of a variety of fastening means including screws, nuts and bolts, welds or other fastening means.

In another embodiment, a grilling device 100 is provided which includes an oven section 102 having an outer wall 110 that at least partially bounds an internal grilling compartment 103. The outer wall has opposing first and second side portions 111 and an encircling body portion 113 extending therebetween. The body portion 113 has an access opening 112, a lid 120 attached to the outer wall 110 that is actuatable between a closed position (e.g. as generally shown in FIG. 1A) in which the lid 120 covers the access opening 112, and an open position in which the access opening 112 is uncovered (as generally shown in FIG. 1B).

As previously discussed relevant to FIGS. 1A-5, the grilling device 100 can also include a handle 138 attached to the lid 120, and opposing hinge elements 140 connected to the lid 120 and to the outer wall. The hinge elements 140 include a first hinge element connected to the lid 120 and to the first side portion 111 and a second hinge element connected to the lid 120 and to the second side portion. The hinge elements 140 may include an elongated hinge body 146 with a curved upper edge 148. The curved upper edge 148 of the elongated hinge body 146 may be contoured to the curved shape of a peak 164 in the upper portion of the oval-shaped side wall 111.

In some cases, each of the opposing side portions 111 has a substantially oval shape with an upper curved edge 163, an opposing lower curved edge 162, and opposing linear side edges 161 extending between the upper and lower curved edges. The hinge elements that are affixed to each side of the lid 120 may include an elongated body 146 extending longitudinally from a front part of the side portion 111 of the outer wall 110 to an opposing rear part of the side portion. The front end of the hinge element 140 may be connected to the lid 120 adjacent to the front part of the side portion 111, and a rear end of the hinge element 140 may be connected to the side portion 111 at an interface 142 at the rear part of the side portion 111. The same may also be true for the hinge 140 disposed on the opposing side of the outer wall 110.

The interface 142 at which the lid 120 attaches to the outer wall 110 of the grilling device may include a pivot point about which the hinge element 140 is rotatably attached. The opposing side of the grilling device may include another interface that also includes a pivot point about which the hinge element 140 on the opposing side is rotatably attached. These two pivot points may be substantially aligned to allow for smooth operation of the lid 120. The access opening 112 of the grilling device 100 may include a rear edge, where the opposing hinge elements 140 are connected to the outer wall 110 substantially rearward of the side edge 118 of the grill body 113.

In another embodiment, a grilling apparatus is described which includes a support structure 104 with multiple supporting legs, and an oven section 102 having an outer wall 110 with opposing side walls 111. Each side wall has a peak 164 in an upper portion thereof 163. The oven section 102, the outer wall 110 and the opposing side walls 111 may have a substantially oval-shaped configuration, as shown in FIG. 1A. The grilling apparatus may also have a lid 120 movably connected to each of the opposing side walls 111 of the outer wall 110. This moveable connection at interface 142 facilitates actuation of the lid to, in turn, provide access to the oven section 102 of the grilling device.

Still further, the grilling apparatus includes multiple opposing hinge elements 140 attached to the lid 120 and to the opposing side walls 111 of the outer wall 110. The hinge elements 140 are affixed to the upper portion 163 of each of the opposing side walls 111 below the peak 164, and are further affixed to a rearward portion of a side edge 132 of the lid 120. As such, actuation of the lid follows a specified arc, as generally shown in FIG. 3.

Figure 6:
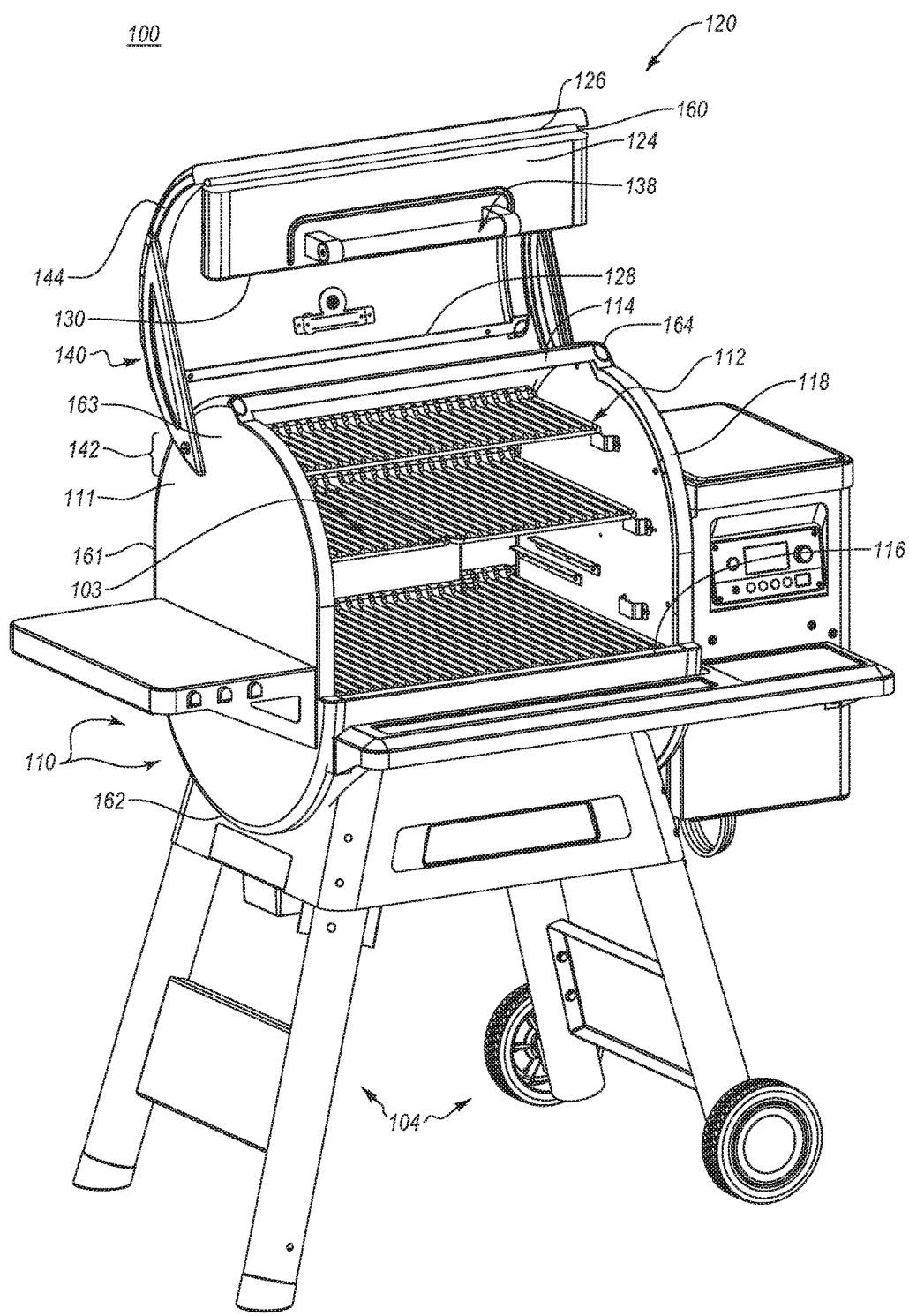
FIG. 6 illustrates a perspective view of the grilling device having the lid of FIG. 4.

In the embodiment illustrated in FIG. 6, the lid 120 of the grilling apparatus 100 includes an upper panel 122 and a lower panel 124 connected via one or more hinges 160 at the seam 126. In the open configuration shown in FIG. 6, in which the lid 120 of the grilling device 100 is open, the hingedly attached lower panel 124 extends downward from the upper panel 122 at an angle that is less than 90 degrees relative to the upper panel 122. The lower panel 124 may hand down so as to allow easier access to the handle of the grill. The hingedly attached lower panel 124 also follows a different opening arc, such that when the lid 120 is opened by a user, the lid follows an arc that flows substantially away from the user, and ends at an end point 204*b* that is substantially closer to the starting point 202.

The lid 120 of the grilling apparatus may attach to each opposing side wall 111 at an interface located substantially rearward of the peaks 164 of the upper portions 163 of the opposing side walls 111. Each interface to which the lid 120 is attached may include a fastening means that allows for rotational movement of the lid 120 vis-à-vis the outer wall 110. The lid 120 provides access to an access opening 112 that has a rear edge defined by the outer wall 110. The opposing hinge elements 140 are connected to the outer wall 110 substantially rearward of the side edge 118 of the grill. As illustrated in FIG. 6, which shows a perspective view of the configuration shown in FIGS. 4 and 5, the opposing hinge elements allow the lid 120 to follow a specifically designed opening arc that places the user's hands and arms advantageously away from the edge of the lid to prevent burns to the user.

The foregoing detailed description makes reference to specific exemplary embodiments. However, it will be appreciated that various modifications and changes can be made without departing from the scope contemplated herein and as set forth in the appended claims. In particular, while illustrative exemplary embodiments in this disclosure have been more particularly described, the present disclosure is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description, which examples are to be construed as non-exclusive.

Moreover, any steps recited in any method or process described herein and/or recited in the claims may be executed in any order and are not necessarily limited to the order presented in the claims, unless otherwise stated (explicitly or implicitly) in the claims. Accordingly, the scope of the invention should be determined solely by the appended claims and their legal equivalents, rather than by the descriptions and examples given above. It will also be appreciated that various features, members, elements, parts, and/or portions of certain embodiments of the present invention are compatible with and/or can be combined with, included in, and/or incorporated into other embodiments of the present invention.

Thus, disclosure of certain features, members, elements, parts, and/or portions relative to a specific embodiment of the present invention should not be construed as limiting application or inclusion of said features, members, elements, parts, and/or portions to the specific embodiment. Rather, it will be appreciated that other embodiments can also include said features, members, elements, parts, and/or portions without necessarily departing from the scope of the present invention. Likewise, certain embodiments can include fewer features than those disclosed in specific examples without necessarily departing from the scope of this disclosure.

In addition, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A grilling device, comprising:
    an oven section having an outer wall including opposing side walls, each side wall having a curved upper portion with a peak, and having a substantially vertical lower portion;
    a lid movably connected to each of the opposing side walls of the outer wall, the moveable connection allowing actuation of the lid to provide access to the oven section of the grilling device; and
    two hinge elements attached respectively to each end of the lid and to the respective opposing side walls of the outer wall, each hinge element being affixed to the opposing side walls below the peak of the curved upper portion and above the substantially vertical lower portion, and further being affixed to a rearward portion of a side edge of the lid, such that actuation of the lid follows a specified arc.

2. The grilling device of claim 1, wherein the oven section, the outer wall and the opposing side walls have a substantially oval-shaped configuration.

3. The grilling device of claim 1, wherein the lid comprises an upper panel and a lower panel separated by a seam.

4. The grilling device of claim 3, further comprising a handle fixedly mounted to the lower panel of the lid.

5. The grilling device of claim 3, wherein the upper panel of the lid is hingedly attached to the lower panel of the lid.

6. The grilling device of claim 5, wherein in an open configuration in which the lid of the grilling device is open, the lower panel extends downward from the upper panel at an angle.

7. The grilling device of claim 5, wherein in a closed configuration in which the lid of the grilling device is closed, the lower panel extends downward from the upper panel in a substantially linear direction.

8. The grilling device of claim 1, wherein the hinge element includes an elongated hinge body with a curved upper edge.

9. The grilling device of claim 1, wherein the curved upper edge of the elongated hinge body is contoured to the curved shape of the peak in the upper portion of the side wall.

10. A grilling device, comprising:
    an oven section having an outer wall at least partially bounding an internal grilling compartment, the outer wall having opposing first and second side portions and an encircling body portion extending therebetween, the body portion having an access opening, the first and second side portions of the outer wall having a curved upper portion with a peak, and having a substantially vertical lower portion;
    a lid attached to the outer wall that is actuatable between a closed position in which the lid covers the access opening and an open position in which the access opening is uncovered;
    a handle attached to the lid; and
    opposing hinge elements connected to the lid and to the outer wall, the hinge elements comprising:
        a first hinge element connected to the lid and to the first side portion, wherein the first hinge element is affixed to the curved upper portion of the first side portion of the outer wall below the peak of the upper portion and above the substantially vertical lower portion; and
        a second hinge element connected to the lid and to the second side portion, wherein the second hinge element is affixed to the curved upper portion of the second side portion of the outer wall below the peak of the upper portion and above the substantially vertical lower portion.

11. The grilling device of claim 10, wherein each of the first and second side portions has a substantially oval shape with an upper curved edge, an opposing lower curved edge, and opposing linear side edges extending between the upper and lower curved edges.

12. The grilling device of claim 10, wherein the first hinge element comprises an elongated body extending longitudinally from a front part of the first side portion to an opposing rear part of first side portion, a front end of the first hinge element being connected to the lid adjacent to the front part of the first side portion and a rear end of the first hinge element being connected to the first side portion at a first interface at the rear part of the first side portion, the second hinge element comprising an elongated body extending longitudinally from a front part of the second side portion to an opposing rear part of second side portion, a front end of the second hinge element being connected to the lid adjacent to the front part of the second side portion and a rear end of the first hinge element being connected to the second side portion at a second interface at the rear part of the second side portion.

13. The grilling device of claim 12, wherein the first interface comprises a first pivot point about which the first hinge element is rotatably attached and the second interface comprises a second pivot point about which the second hinge element is rotatably attached, the first pivot point being substantially aligned with the second pivot point.

14. The grilling device of claim 10, wherein the access opening comprises a rear edge, the opposing hinge elements being connected to the outer wall substantially rearward of a side edge of the grill body.

15. A grilling apparatus, comprising:
a support structure comprising a plurality of legs;
an oven section having an outer wall including opposing side walls, each side wall having a curved upper portion with a peak, and having a substantially vertical lower portion, the oven section, the outer wall and the opposing side walls having a substantially oval-shaped configuration;
a lid movably connected to each of the opposing side walls of the outer wall, the moveable connection allowing actuation of the lid to provide access to the oven section of the grilling apparatus; and
a plurality of opposing hinge elements attached to the lid and to the opposing side walls of the outer wall, the hinge element being affixed to the upper portion of each of the opposing side walls below the peak of the upper portion and above the vertical portion, and further being affixed to a rearward portion of a side edge of the lid, such that actuation of the lid follows a specified arc.

16. The grilling apparatus of claim 15, wherein the lid comprises an upper panel and a lower panel connected via one or more hinges.

17. The grilling apparatus of claim 16, wherein in an open configuration in which the lid of the grilling device is open, the hingedly attached lower panel extends downward from the upper panel at an angle that is less than 90 degrees relative to the upper panel.

18. The grilling apparatus of claim 16, wherein the lid attaches to each opposing side wall of the grilling apparatus at an interface located substantially rearward of the peaks of the upper portions of the opposing side walls.

19. The grilling apparatus of claim 18, wherein each interface to which the lid is attached comprises a fastening means that allows for rotational movement of the lid vis-à-vis the outer wall.

20. The grilling apparatus of claim 15, wherein the lid provides access to an access opening having a rear edge, and wherein the opposing hinge elements are connected to the outer wall substantially rearward of a side edge of the grill body.

* * * * *